United States Patent [19]

Dennis

[11] Patent Number: 4,788,676
[45] Date of Patent: Nov. 29, 1988

[54] RECORD PLAYER

[76] Inventor: James T. Dennis, 2312 NW. 57th St., Oklahoma City, Okla. 73112

[21] Appl. No.: 944,462

[22] Filed: Dec. 19, 1986

[51] Int. Cl.⁴ ............................................. G11B 17/08
[52] U.S. Cl. .................................... 369/176; 369/226; 369/244; 369/264
[58] Field of Search ................ 369/244, 225, 226, 264, 369/176

[56] References Cited

U.S. PATENT DOCUMENTS

| 2,529,251 | 8/1950 | Mullaney | 369/226 |
| 3,090,625 | 5/1963 | Hansen | 369/225 |
| 3,892,415 | 7/1975 | Takahashi et al. | 369/225 |
| 3,934,080 | 1/1976 | Janssen | 369/266 |
| 4,435,800 | 3/1984 | Dennis et al. | 369/225 |

Primary Examiner—Steven L. Stephan
Attorney, Agent, or Firm—Mason, Kolehmainen, Rathburn & Wyss

[57] ABSTRACT

An improved automatic record player utilizes an integrally formed cam on the underside of the turntable in conjunction with a velocity trip mechanism to raise the tone arm from the record and move it up and over onto the rest post in one revolution of the turntable. An improved tone arm mount utilizes an integrally formed tone arm support shaft and trip finger assembly that is mounted from the underside of the base.

25 Claims, 5 Drawing Sheets

RECORD PLAYER

BACKGROUND OF THE INVENTION

1. Field of the Invention

This invention relates generally to record players, and more particularly to manual and automatic return record players.

2. Description of the Prior Art

Record players have been manufactured for many years and fall into three general categories, namely, manual players, automatic players, and changers. Manual players have generally been used by high fidelity enthusiasts because they have fewer moving parts and consequently can provide more faithful reproduction; however, many people object to players not automatically shutting off and returning the tone arm to the rest post. Changers that stack and automatically play a number of records in sequence are very convenient to operate but the changing mechanism is quite complex, and can be relatively costly. Automatic record players that automatically play a single record, one or a multiple number of times and then return the tone arm to the rest post have become popular because they avoid much of the inconvenience of a manual player while eliminating much of the complexity associated with changers. Examples of such an automatic player is disclosed in U.S. patent application Ser. No. 732,242, filed May 8, 1985. However, while the prior art record players have achieved a considerable amount of simplification over record changers there is still a need to simplify their construction to achieve better reliability and performance at lower cost. In particular, there is a need to simplify the tone arm returning mechanism and the tone arm mount.

SUMMARY OF THE INVENTION

Accordingly, it is an object of the present invention to provide an improved record player that overcomes many of the disadvantages of the prior art record players.

It is another object of the present invention to provide a simplified automatic record player.

It is another object of the invention to provide a record player having a cam on the bottom of the turntable that is engaged by a cam follower when a record has finished playing and causes the tone arm to be lifted from the record and placed on the rest post.

It is another object of the invention to provide an improved tone arm mount that is suitable for use with all types of record players.

It is another object of the invention to provide low cost manual cueing and manual shut off record players.

Thus, in accordance with a preferred embodiment of the invention, there is provided a cam on the lower surface of the turntable in the form of a downwardly extending curved wall. The wall is eccentrically disposed about the spindle of the turntable and has a gap in it. A cam follower is disposed on the base of the player beneath the turntable, and is normally positioned inside the wall. At the end of a record, the cam follower is urged through the gap in the wall by the tripping mechanism, preferably a velocity trip, and is engaged by the exterior surface of the wall. The cam follower follows the exterior surface of the wall for substantially a complete revolution of the turntable. A linkage is provided between the cam follower and the tone arm to cause the tone arm to be lifted off of the record and moved over and set down on the rest post during this revolution. Upon completion of the single revolution of the turntable, the cam follower returns to the inside of the wall through the gap.

A simplified tone arm mount is also provided. In the preferred embodiment, a tone arm support having an upwardly extending knife edge bearing member is provided on the top of the player base. A pair of apertures are formed in the support member adjacent the knife edge bearing member. An integrally formed tone arm shaft has a pair of upwardly extending ears, each having an aperture therethrough, disposed at an upper end thereof and an integrally formed trip finger at the lower end thereof. The ears protrude upwardly through the apertures in the support member. The back of the tone arm receives the two ears and a pin is inserted through the ears and through aligned holes in the tone arm. The pin thus serves as a hinge to retain the back of the tone arm on the shaft and also rides on the knife edge bearing to provide a thrust bearing for the tone arm.

DESCRIPTION OF THE DRAWING

These and other objects and advantages of the present invention will become readily apparent upon consideration of the following detailed description and attached drawing wherein:

FIG. 8 is an exploded perspective view of the player according to the invention;

DETAILED DESCRIPTION OF THE PREFERRED EMBODIMENT

Figure 1:
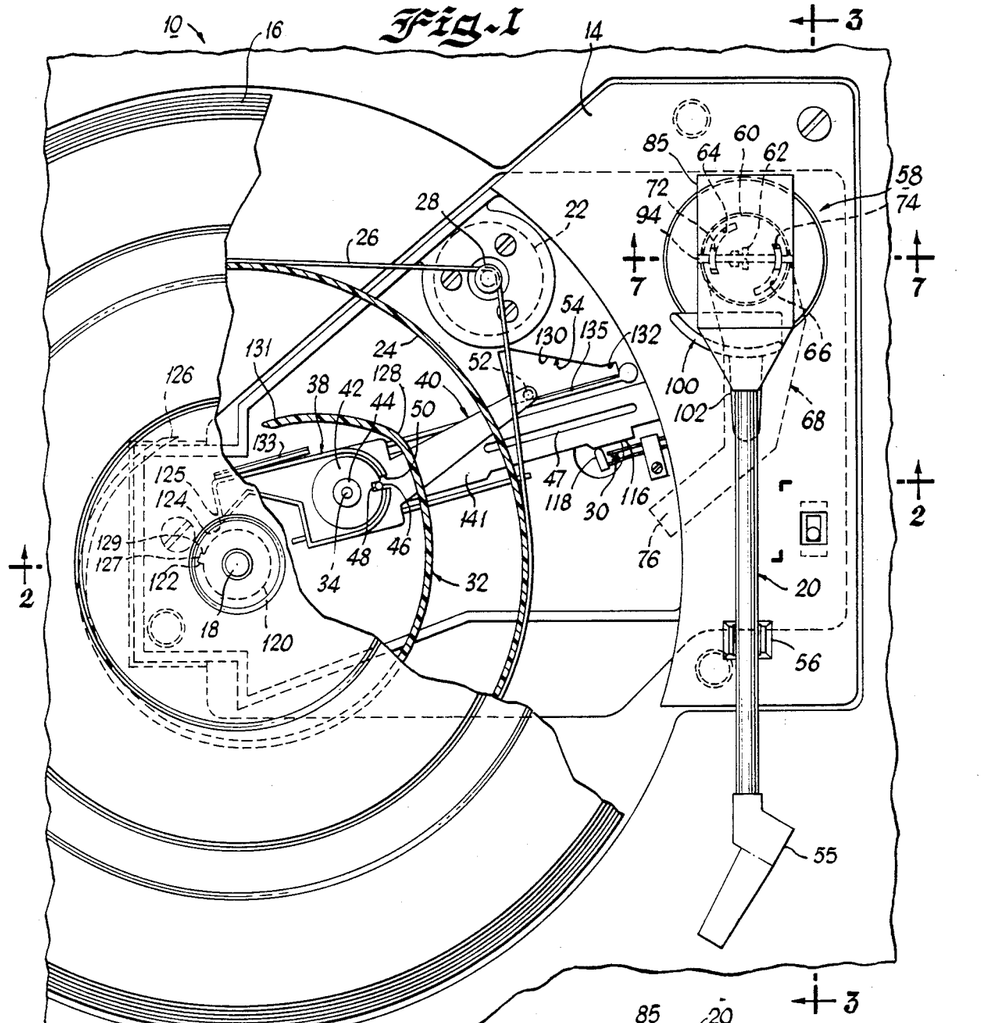
FIG. 1 is a plan view of a record player constructed in accordance with the present invention.
Figure 2:
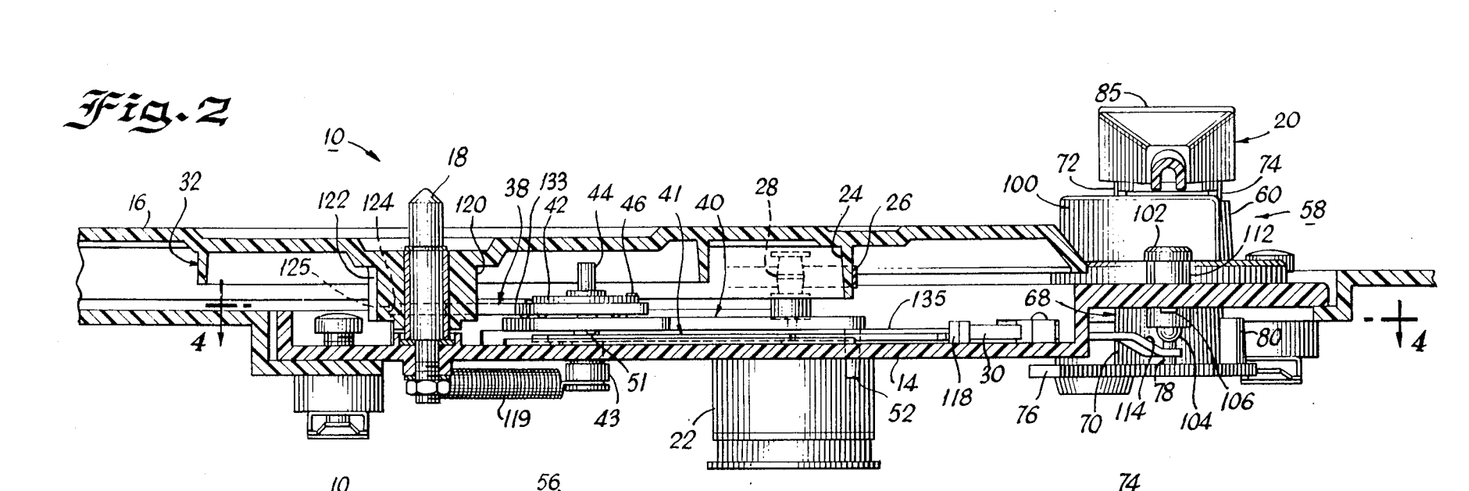
FIG. 2 is a front sectional view of the record player according to the invention taken along line 2—2 of FIG. 1.

Referring now to the drawing, with particular attention to FIG. 1, there is shown a top view of the record player according to the invention, generally designated by the reference numeral 10. The player 10 has a base 14, which in the present embodiment is a quarter base, but may also be a half base or full base, a turntable 16 that is mounted on a spindle 18, a tone arm 20, and a turntable driving motor 22. Extending downwardly from the turntable 16 is a drive hub, which is preferably integrally formed with the turntable 16, preferably from plastic. A drive belt 26 engages the drive hub 24 and a drive pulley 28 that is driven by the motor 22. A normally closed switch 30 selectively energizes the motor 22 to drive the turntable 16 via the drive belt 26.

In accordance with an important aspect of the invention, there is provided a cam on the bottom of the turntable, preferably in the form of an integrally formed wall 32. The outside surface of the wall 32 engages a cam follower 34 and causes the tone arm 20 to be returned to its rest position during a trip cycle after the record has been played. The cam follower 34 forms part of a pin 36 (best seen in FIG. 8) that pivotably connects a trip pawl 38 to a trip arm 40, and is secured to a slide 41. A weight 42 is placed over the trip pawl 38 and a bushing 44 secures the assembly together. The pin has a head 43 that slides in a slot 45 in the base 14 of the player. A rib 47 on the bottom of the slide 41 reduces the friction between the slide 41 and the base 14.

A pin 46 extending upwardly from the trip arm 40 engages a slot 48 in the weight 42 and cause the weight 42 to rotate with the trip arm 40. The weight 42 exerts a downward force on the assembly to increase the friction between the pawl 38 and the arm 40. The rotation of the weight 42 with the trip arm 40 introduces another friction surface between the upper surface of the pawl 38 and the lower surface of the weight 42 further to increase the friction force between the pawl 38 and the arm 40. A plurality of bumps 49 on opposite sides of the trip pawl 38 reduce the friction and make the friction setting more uniform and controllable. A bump 51 on the lower surface of the arm 40 reduces the friction between the arm 40 and the slide 41. The pin 46 also passes through a slot 50 in the trip pawl 38 and limits the relative rotation between the pawl 38 and the arm 40. A downwardly extending pin 52 on the trip arm 40 engages a triangular opening 54 in the base 14 of the turntable and serves properly to position the trip pawl 40, as will be described in a subsequent portion of the specification.

The tone arm 20 has a cartridge supporting head 55 and rests on a tone arm support 56. The tone arm 20 is mounted to the base 14 by a tone arm mount, generally designated by the reference numeral 58. The tone arm mount 58 includes a tone arm supporting member in the form of an upwardly extending boss 60. Extending upwardly from the boss 60 is a bearing member in the form of a knife edge bearing 62. A pair of curved apertures 64 and 66 are formed in the support member 60 adjacent to the bearing member 62. The tone arm 20 is carried by an integrally formed shaft assembly 68 that includes a tone arm shaft 70, a pair of upwardly extending ears 72 and 74 and a trip finger 76 extending from the lower part of the tone arm shaft 70. Extending upwardly from the trip finger 76 are a pair of upstanding members 78 and 80. The member 78 engages a protrusion 82 (FIG. 4) on the slide 41 and serves to slide the slide 41 toward the switch 30 to thereby deenergize the motor 22 when the tone arm 20 is on the rest post 56. The member 80 is engaged by an arm 84 on the slide 41 in order to bring the tone arm 20 back to the rest post 56 after a record has been played, as will be explained in greater detail in a subsequent portion of the specification.

The tone arm shaft 70 is a tubular shaft having a tapered inner surface, and the support member 60 has a tapered boss depending downwardly therefrom. The shaft 70 is mounted from the bottom of the base such that the downwardly depending boss 81 extends into the shaft 70 and the ears 72 and 74 extend through the apertures 64 and 66 of the support member 60. The tone arm 20 has a supporting end 85 that is placed over the ears 72 and 74. The supporting end 85 of the tone arm 20 has a pair of holes 86 and 88 formed therein that are aligned with a pair of holes 90 and 92 formed in the ears 72 and 74. To mount the arm 20 to the shaft assembly 68, the holes 86 and 88 are aligned with the holes 90 and 92, respectively, and a pin 94 is inserted therethrough. The pin forms a hinge pin between the supporting end 85 of the tone arm 20 and the ears 72 and 74, and permits the tone arm to be moved up and down. In addition, the pin 94 cooperates with the knife edge bearing 62 to form a thrust bearing that permits the tone arm to be moved between the record and the rest post 56. The advantage of the tone arm mounting just described is that it is easy to assemble and requires a minimal number of parts. The knife edge 62 and the pin 94 also providing a very good bearing. In addition, because the shaft 70, the ears 70 and 72 as well as the trip finger 76 and members 78 and 80 all form part of the integral assembly 68, registration between the tone arm 20 and the trip finger 76 and members 78 and 80 is assured, thus eliminating the need for any registration adjustments. Even in manual players, where the trip finger 76 and the members 78 and 80 would not be used, the assembly would still provide a good tone arm mount because of the simplicity of its design and the quality of its bearing. Although the tone arm mount has been described as utilizing two ear members and a pin, a number of ear members (one or more) may be used, and means other than a pin may be used to secure the tone arm to the ear member(s). Also, a bearing other than a knife edge bearing may be used.

A tone arm lifting member 100 having a laterally extending arm 102 and two downwardly extending posts 104 and 106 is provided. The posts 104 and 106 pass through a pair of apertures 108 and 110, respectively, in a boss 112 in the base 14. The post 106 may be engaged from below the base by a cueing lever (not shown) to raise the tone arm as desired. The post 104 is engaged by an inclined surface 114 of the slide 41 during the automatic return cycle at the end of a record, as will be described in detail in a subsequent portion of the specification.

Figures 3, 5:
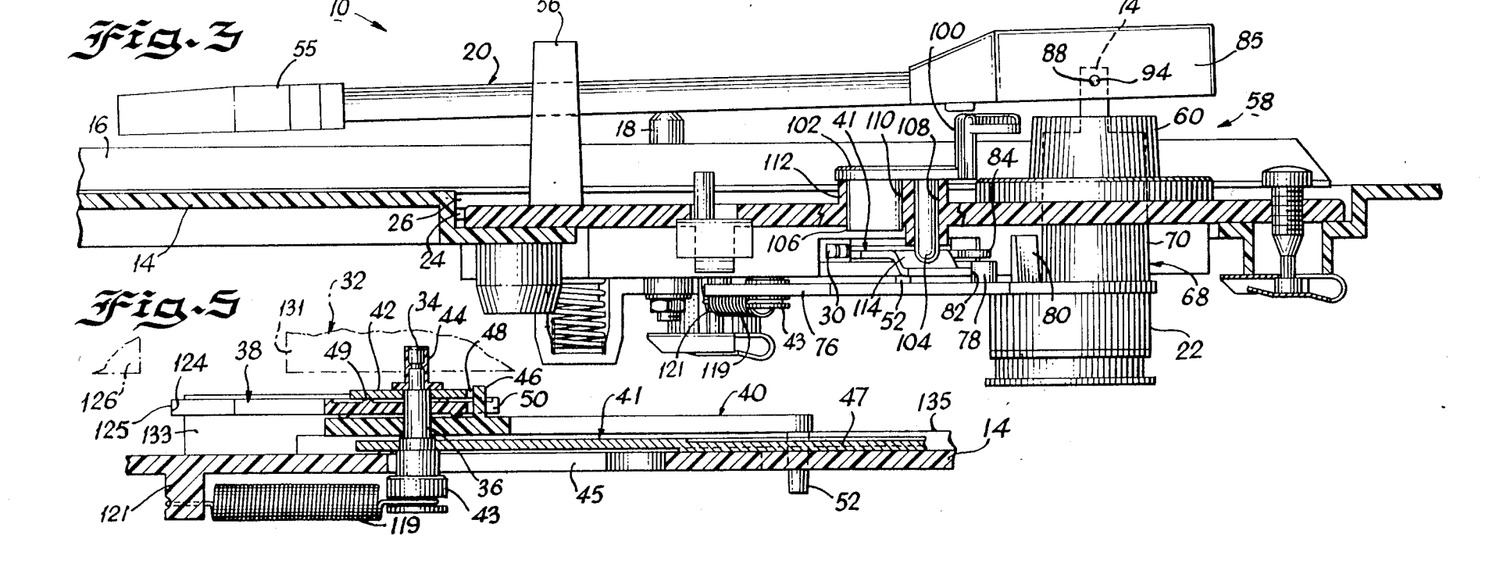
FIG. 3 is a side sectional view of the record player taken along line 3—3 of FIG. 1.
FIG. 5 is a sectional view taken along line 5—5 of FIG. 4.
Figures 4, 9, 10:
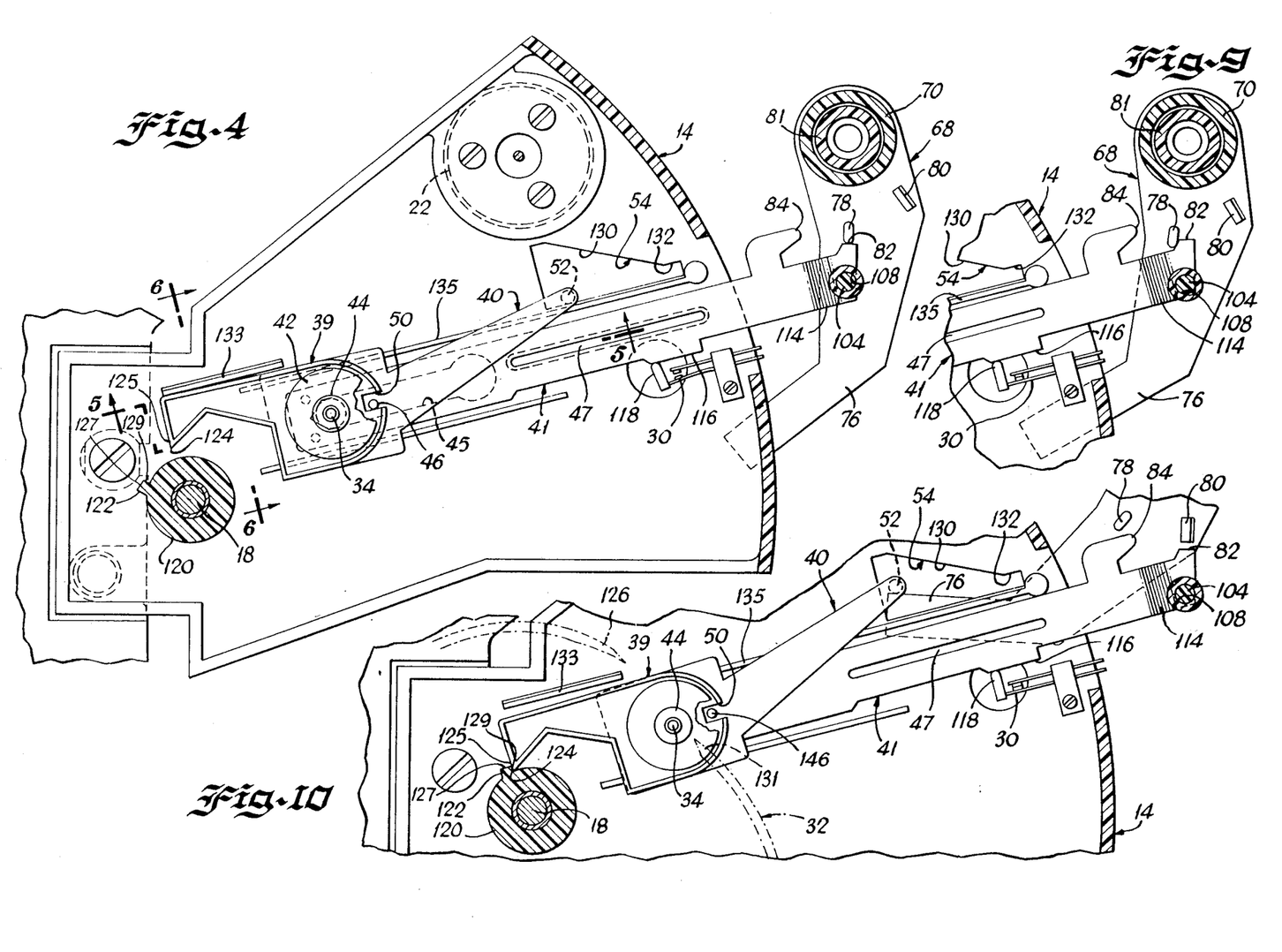
FIG. 4 is a plan sectional view taken along line 4—4 of FIG. 2.
FIG. 9 is a plan sectional view showing the movement of the slide member of FIG. 4 to open the switch in response to the rotation of the trip finger.
FIG. 10 is an enlarged view of the trip mechanism of FIG. 1 showing the positions of the trip mechanism at the end of a record play cycle.
Figure 5:
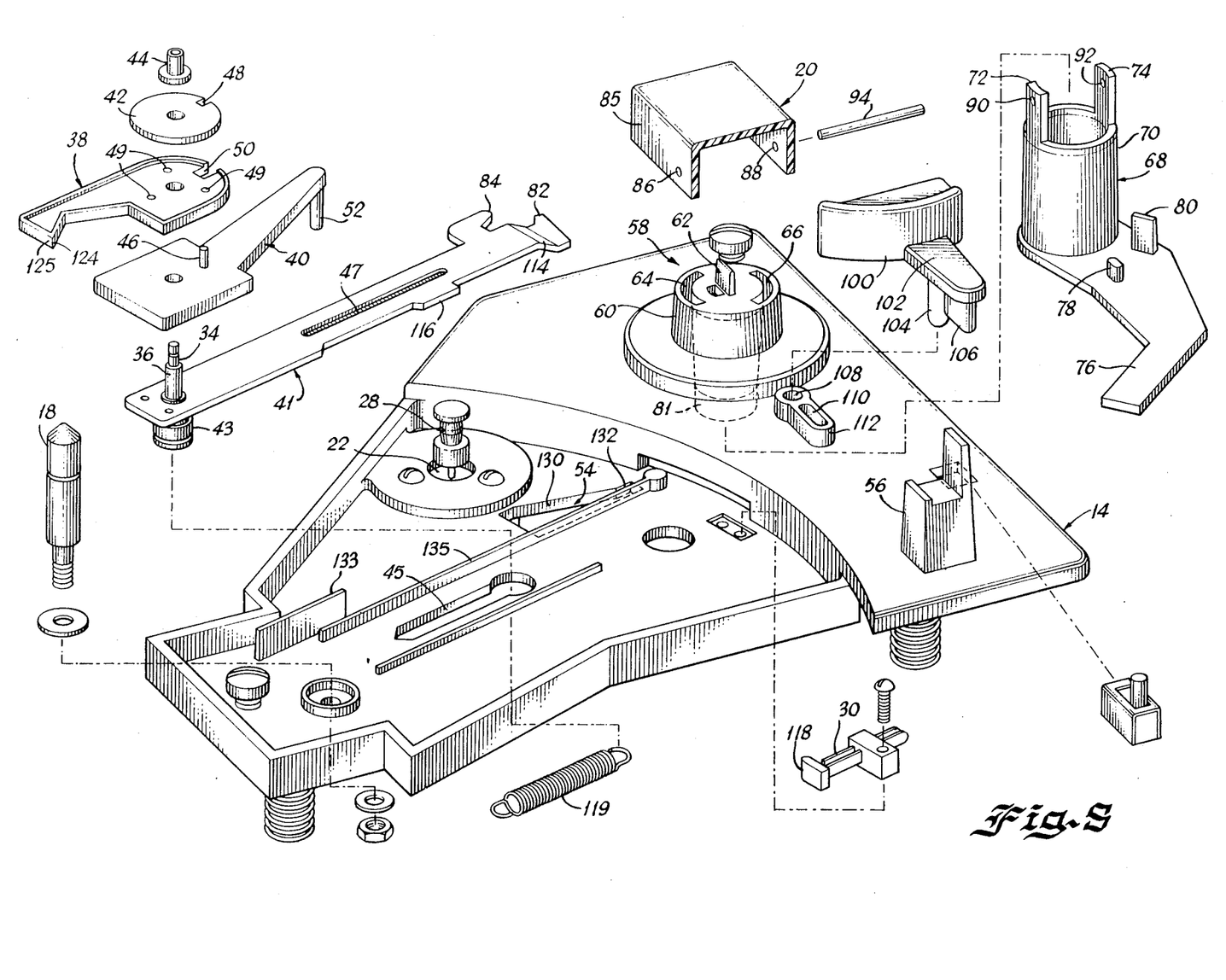
Figure 6:
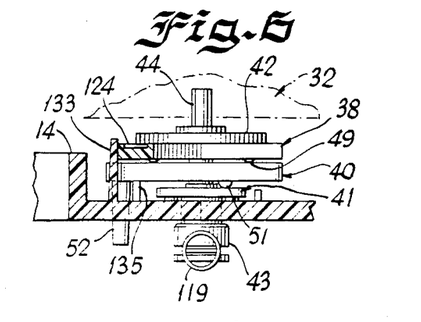
FIG. 6 is a sectional view taken along line 6—6 of FIG. 4.
Figure 7:
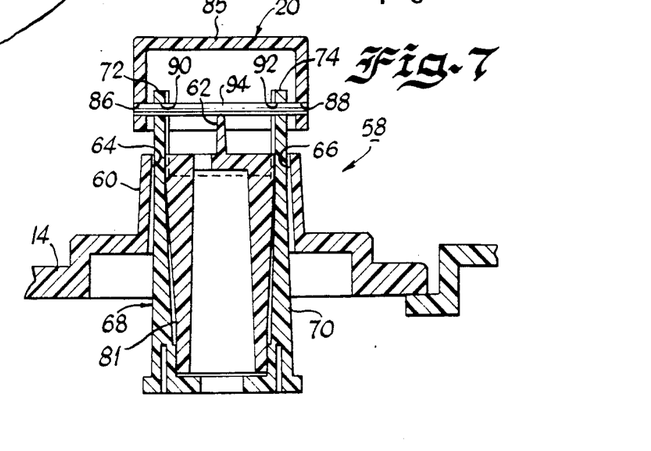
FIG. 7 is a sectional view taken along line 7—7 of FIG. 1, illustrating the details of the tone arm mount according to the invention.

In operation, with the tone arm 20 on the rest post as shown in FIG. 1, the member 78 on the trip finger 76 engages the protrusion 82 on the slide 41 to move the slide 41 laterally so that another protrusion 116 engages a finger 118 on the switch 30 to maintain the switch open as shown to thereby deenergize the motor as shown in FIG. 4. As the tone arm 20 is removed from the rest post 56 and moved toward a record on the turntable 16, the member 78 disengages from the protrusion 82 thus permitting the switch 30 to close as shown in FIG. 9. The spring bias normally closing the switch 30 is sufficient to slide the slide 41 laterally enough to permit the switch 30 to close. Once the switch 30 has closed and the tone arm 20 has been placed on the record on the turntable 16, the record will continue to play until it reaches the end of the record at which point a velocity trip will cause automatic cycling of the player. Operation is as follows. As the record begins to play, the trip lever 76 is turned slightly clockwise from the position shown in FIG. 1. As the record continues to play and the tone arm is moved toward the center of the record, the trip finger 76 continues to rotate clockwise until it engages the pin 52 that extends through the aperture 54. Before trip occurs, the trip pawl 38 and the trip arm 40 and the slide 41 are positioned as shown in FIG. 1 and 4, with the slide 41 being biased to the left by an extension spring 119 (best shown in FIG. 5) that is attached to a boss 121 on the underside of the base 16 and to the head 43 of the pin 36. After the pin 52 has been engaged by the trip finger 76 the trip arm 40 will be slowly turned counterclockwise. The counterclockwise motion of the trip arm 40 will be transmitted to the trip pawl 38 because of the friction between the trip pawl 38, the trip arm 40 and the weight 42. The turntable 16 has an integrally molded hub 120 that has an integrally molded cam 122 extending therefrom. The trip pawl 38 has a point 124 that is initially positioned as shown so that it is not contacted by the cam 122 as the turntable rotates. However, as the trip pawl 38 is rotated counterclockwise as the record plays, the point 124 will be brought closer to the hub 120 until it begins to contact the cam 122. If the tone arm is still over the recorded grooves of the record, the trip pawl will be rotated counterclockwise very slowly, and as the point 124 begins to touch the cam 122 it will engage an inclined surface 127 the cam 122 and be pushed back slightly by the inclined surface 127 against the frictional forces between the trip pawl 38 and the trip arm 40 each time the record rotates. However, after the tone arm enters the run out grooves near the center of the record, the pawl 38 will be rotated sufficiently during one revolution of the record to permit an engaging surface 125 of the pawl 38 to be engaged by an engaging surface 129 of the cam 122 as shown in FIG. 10. Although FIG. 10 shows the engaging surface 125 completely engaged by the cam 122, partial engagement is sufficient to start a cycle. When the surface 125 is engaged by the cam 122 the slide 41 will be pushed to the right against the biasing force of the spring 119. The cam follower 34 will move with the slide 41 to the right through the gap in the cam 32 thus positioning it to be engaged by the point 126 of the cam 32 as the turntable 16 continues to rotate.

As the turntable 16 continues to rotate, the cam follower 34 will be engaged by a slanted surface 126 and moved to the outside of the wall 32. The spring 119 will maintain the cam follower 34 against the outside surface of the wall 32. As the turntable continues to rotate, the cam follower 34 will be moved radially outwardly from the spindle 18 causing the slide 41 to move to the right. As the slide 41 moves to the right, the inclined section 114 (FIG. 8) will engage the post 104 thus raising the tone arm lifting member to lift the tone arm 20 from the record. Subsequently, the arm 84 will engage the upper member 80 on the trip finger 76 thus rotating the trip finger 76 and tone arm 20 counterclockwise until the tone arm 20 is positioned over the rest post.

When the tone arm 20 is positioned over the rest post, the turntable has made almost a complete revolution since the beginning of the cycle and the cam follower 34 will be positioned at approximately point 128 on the wall 32. Further revolution will cause the slide to be drawn inwardly by the spring 119, and the cam follower 34 will eventually return to the position shown in FIG. 1, with the cam follower returning to its original position through the gap between the point 126 and a point 131. The post 78 will engage the finger 82, thus laterally moving the slide 41 downwardly to again open the switch 30. The post 104 will slide down the surface 114 thus permitting the tone arm to be lowered into the rest post 56. By utilizing substantially a complete revolution (or at least more than one-half of a revolution) of the turntable to return the tone arm to the rest post and only a small percentage of a revolution to return the mechanism to its initial position, thereby returning the tone arm to the rest position in a slow, smooth manner.

As previously discussed, just before the trip occurred, the trip pawl 38 was rotated with respect to the trip arm 40 against the force of the friction between the two arms. Thus, just before tripping, there was a more acute angle between the trip pawl 38 and the trip arm 40, and it is necessary to reset the two arms and the pin 52 to the position shown in FIG. 1 for the next operation. This is accomplished by the shape of the aperture 54 in the base 14. The aperture 54 has a slanted surface that engages the pin 52 as the slide 41 moves to the right during the cycle. As it does so, it moves the pin downwardly and eventually into a slot 132. This resets the trip arm 40 to its original position. A rib 133 maintains the trip pawl 38 in position during the reset. The proper position of the pawl 38 is maintained during return by the rib 133, and the position of the arm 40 is maintained by providing a rib 134 over which the trip arm 40 rides. The frictional force between the arm 40 and the rib 135 places a counterclockwise rotational force on the arm 40 as the slide 41 is returned to its original position. The frictional force between the arm 40 and the rib 135 is greater than the friction between the bump 51 and the arm 40 thus providing a counterclockwise force that assures that the arm 40 is maintained in the position set by the slot 132.

In accordance with an alternative embodiment of the present invention, the trip arm 40 may be eliminated and the trip pawl 38 replaced by a longer trip pawl 138 (FIGS. 11 and 15), and the function of the trip arm 40 replaced by an extension or wireform 140 carried on a trip finger 176, similar to the trip finger 76. The extension 140 is attached to the trip finger 176 by means of an extension spring 142 that is attached to an end 200 of the extension 140 that passes through an aperture 202 within the trip finger 176. The other end of the extension spring 142 passes through an aperture 206 in the trip finger 176 and is retained therein by a pair of enlarged turns 208 at the end of the spring 142. In addition to retaining the extension in position, the spring 142 causes the extension to pivot within the aperture 202 thus causing the extension to exert a downward force on a supporting rib 149, and a laterally extending retaining member 144 serves to keep the extension 140 in place. Thus, the interaction of the extension 140 and the support rib 149 provide a frictional force that resists any attempt to pivot the extension 140 within the aperture 202. In addition, the aperture 202 has a tapered end 210 (FIG. 14) that receives the extension 140 because the spring 142 exerts a pressure onto the extension 140 forcing the extension 140 into the tapered end 210. Thus, a further frictional force that resists rotation of the extension 140 within the aperture 202 is provided. The friction forces provided between the extension 140 and the supporting member 149 and the tapered end 210 of the aperture 202 provide a frictional force that serves the same function as the frictional force between the trip pawl 38, the trip arm 40 and the weight 42 of the embodiment illustrated in FIGS. 1-10.

Figures 11, 12, 13, 14, 15:
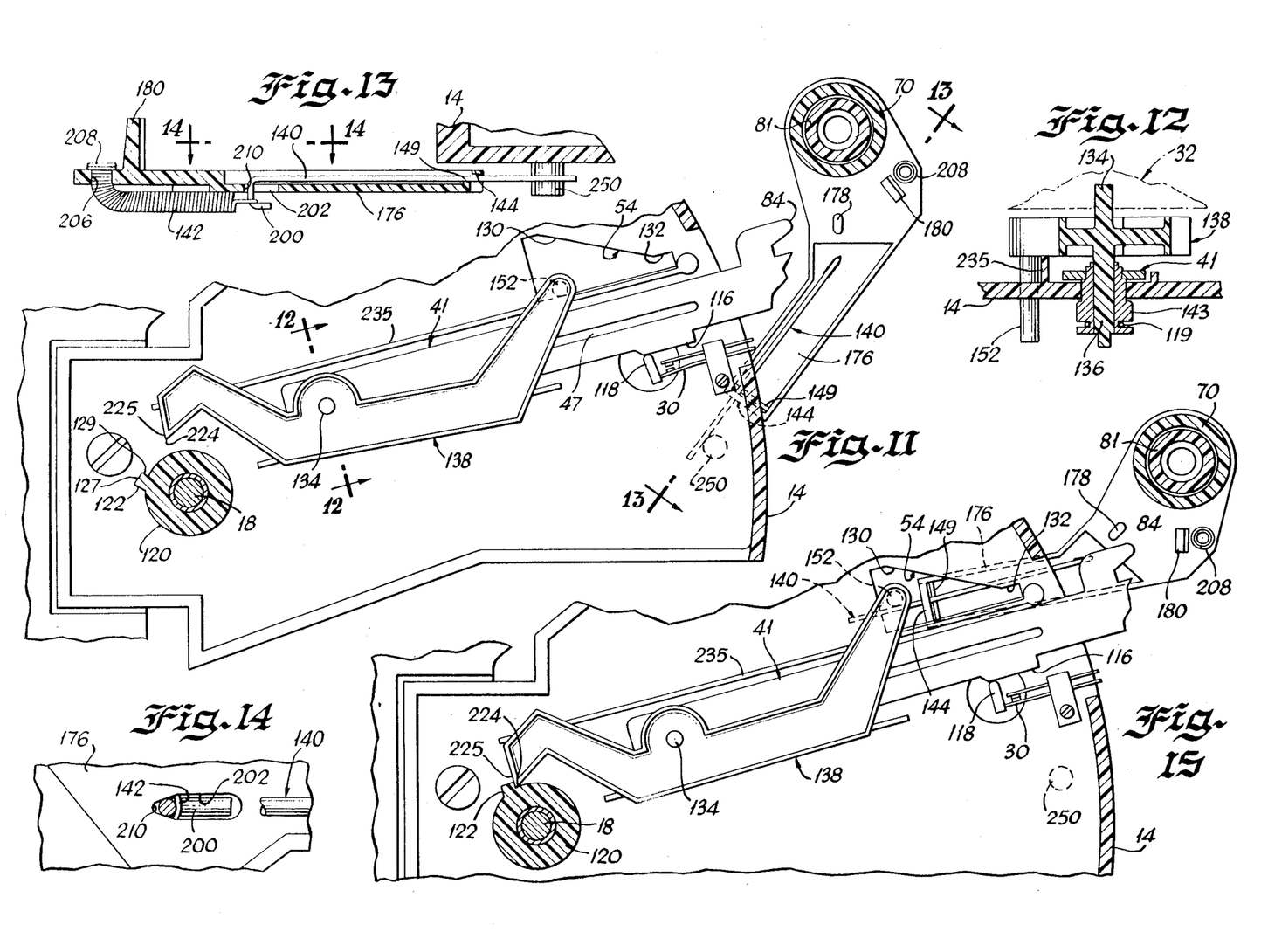
FIG. 11 is a plan view similar to FIG. 4 illustrating an alternative embodiment of the invention.
FIG. 12 is a sectional view taken along line 12—12 of FIG. 11.
FIG. 13 is a sectional view taken along line 13—13 of FIG. 12.
FIG. 14 is a partial plan view taken along line 14—14 of FIG. 13.
FIG. 15 is a plan view similar to FIG. 11 showing the position of the trip mechanism at the end of a play cycle.

In operation, as the record plays, the trip finger 176 begins to turn clockwise until the extension 140 engages the pin 152. At this point the trip pawl 138 begins to turn counterclockwise, thereby bringing a point 224 closer to the inclined surface 127 of the cam 122 on the hub 120. As long as the tone arm is over the recorded grooves of the record, the counterclockwise rotation of the pawl 138 is very gradual, and the pawl 138 is urged in a clockwise direction by the inclined surface 127 of the cam 122 each time the point 224 is contacted. This action causes the pin 152 to urge the extension 140 in a clockwise direction against the friction force provided between the extension 140 and the supporting member 149 and the narrow end 210 of the aperture 202. This action occurs as long as the tone arm is over the recorded grooves of the record; however, as soon as the velocity of the tone arm increases when the needle enters the run-out grooves of the record, the pawl 138 is rapidly turned in a counterclockwise direction thus enabling the engaging surface 225 of the point 224 to be engaged by the surface 129 of the cam 122 as is illustrated in FIG. 15. When this happens, the trip pawl 138 and the slide 141 are urged to the right, thus causing the cam follower 134 to pass through the gap in the cam or wall 32, thereby causing the cam follower 134 to be engaged by the outside surface of the wall 32 and causing the tone arm to be raised and returned to the rest post as previously described in conjunction with FIGS. 1-10. When this occurs, the extension 140 is brought into engagement with a post 250, thereby causing the extension or wireform 140 to be reset to its original position as shown in FIG. 11. As the cycle ends, the slide 41 is moved laterally by the upstanding member 178, therefore by opening the switch 30 as previously described The trip pawl 138 is returned to its original position by the interaction between the pin 152 and the walls of the aperture 54, and maintained in position during the return cycle by friction between the pawl 138 and rib 235.

It should be noted that although the operation has been described with the cam follower being normally positioned inside the wall defining the cam and moved outwardly during a cycle, the reverse could also be done, with the cam follower being normally positioned outside the wall defining the cam and moved inside during the cycle. Also, the cam need not take the form of a wall, and other embodiments of the cam can be used. Also, a pivoted member, link, etc., could be used in place of a slideable member.

Obviously many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A record player comprising:
   a base;
   a tone arm;
   a tone arm supporting member on said base, said supporting member having an upwardly extending bearing member and at least one aperture defined therein adjacent said bearing member;
   a tone arm shaft having at least one ear member extending axially from one end thereof, said tone arm shaft being concentrically disposed with respect to said supporting member with said ear member extending upwardly from beneath said base and through the aperture defined in said supporting member, said tone arm having an end that receives said ear member; and
   means engaging said ear member and said the arm for supporting said tone arm and said tone arm shaft on said bearing member.

2. A record player as recited in claim 1 wherein said tone arm shaft includes an integral cycle initiating member.

3. A record player as recited in claim 1 wherein said tone arm shaft is tapered.

4. A record player as recited in claim 1 wherein said tone arm shaft has an axially extending aperture defined therein, and wherein said supporting member has a boss member extending downwardly therefrom into the axially extending aperture of said tone arm shaft.

5. A record player as recited in claim 4 wherein said downwardly extending boss member and the axially extending aperture in said tone arm shaft are both tapered.

6. A record player as recited in claim 2 wherein said ear member and said cycle initiating member are integrally formed on said tone arm shaft to maintain said tone arm and said cycle initiating member in registration.

7. A record player as recited in claim 1 wherein said upwardly extending bearing member is a knife edge bearing member.

8. A record player comprising:
   a base;
   a turntable rotatably mounted on said base, said turntable having a cam member disposed on the lower surface thereof;
   a tone arm mounted on said base;
   a rest position beyond said turntable;
   means for rotating said turntable;
   an end of record trip mechanism;
   cam follower means disposed beneath said turntable, said cam follower means normally being out of engagement with the cam member on the turntable;
   means responsive to said end of record trip mechanism for urging said cam follower means into engagement with said cam member;
   means for maintaining said cam follower means in engagement with said cam member for substantially a single revolution of said turntable, said cam follower means being moved out of engagement thereafter; and
   means interconnecting said cam follower means and said tone arm for moving the tone arm to the rest post during the substantially single revolution of the turntable that the cam follower means is in engagement with said cam membere said cam having a profile such that more than one-half of a revolution of the turntable is required to move the tone arm to the rest post.

9. A record player as recited in claim 8 wherein said trip mechanism is a velocity trip mechanism.

10. A record player as recited in claim 9 wherein said interconnecting means forms part of said velocity trip mechanism, wherein said velocity trip mechanism includes a trip finger beneath said base mounted for rotation with said tone arm, a slideably mounted member beneath said base, said cam follower means being mounted on said slideably mounted member, a pawl member pivotably mounted on said slide member, a second cam member on the lower surface of the turntable, said trip finger being operative to cause said pawl member to be engaged by said second cam member, said second cam member thereby sliding said slideably mounted member to bring said cam follower member into engagement with said cam member.

11. A record player as recited in claim 10 wherein said cam member is operative to slide said slideably mounted member into engagement with said trip finger to thereby rotate said tone arm toward said rest post.

12. A record player as recited in claim 11 further including a tone arm raising member, wherein said slideably mounted member also engages said tone arm raising member thereby causing said tone arm raising member to raise the tone arm as it is rotated toward said rest post.

13. A record player as recited in claim 12 wherein said record player includes a switch for selectively energizing said turntable rotating means mounted adjacent to said slideably mounted member, said slideably mounted member being laterally movable by said trip finger to cause said slideably mounted member to engage said switch and deenergize said turntable rotating means when said tone arm is positioned over the rest post.

14. A record player as recited in claim 10 wherein said pawl member is pivotably mounted about the longitudinal axis of said cam follower means.

15. A record player as recited in claim 14 further including a trip arm pivotably mounted about said cam follower means, said trip arm having a surface that frictionally engages said trip pawl, a weight above said trip pawl and trip arm for increasing the frictional forces between said trip pawl and trip arm, said trip arm being engageable by said trip finger for causing said trip pawl to engage said second cam member.

16. A record player as recited in claim 14 wherein said trip finger includes an extension member extending therefrom, said extension member frictionally engaging said trip finger and being movable with respect to said trip finger, said pawl member being engageable by said extension member for causing said trip pawl to engage said second cam member.

17. A record player as recited in claim 16 further including resilient biasing means for urging said extension member into frictional contact with said trip finger.

18. A record player as recited in claim 17 wherein said extension member includes an outwardly extending portion and a downwardly extending portion extending through said trip finger, and said biasing means urges said downwardly extending member in a direction to exert a downward force on the outwardly extending portion.

19. A record player as recited in claim 18 wherein said biasing means is an extension spring.

20. A record player comprising:
a base;
a turntable rotatably mounted on said base, said turntable having a cam member on the lower surface thereof;
a tone arm mounted on said base;
a rest position beyond said turntable;
means for rotating said turntable;
an end of record trip mechanism;
cam follower means disposed beneath said turntable, said cam follower means normally being out of engagement with the cam member on the turntable;
means responsive to said end of record trip mechanism for urging said cam follower means into engagement with said cam member;
means for maintaining said cam follower means in engagement with said cam member for substantially a single revolution of said turntable, said cam follower means being moved out of engagement thereafter; and
means interconnecting said cam follower means and said tone arm for moving the tone arm to the rest post during the substantially single revolution of the turntable that the cam follower means is in engagement with said cam member, wherein said cam member is integrally molded to said turntable.

21. A record player comprising:
a base;
a turntable rotatably mounted on said base, said turntable having a cam member on the lower surface thereof;
a tone arm mounted on said base;
a rest position beyond said turntable;
means for rotating said turntable;
an end of record trip mechanism;
cam follower means disposed beneath said turntable, said cam follower means normally being out of engagement with the cam member on the turntable;
means responsive to said end of record trip mechanism for urging said cam follower means into engagement with said cam member;
means for maintaining said cam follower means in engagement with said cam member for substantially a single revolution of said turntable, said cam follower means being moved out of engagement thereafter; and
means interconnecting said cam follower means and said tone arm for moving the tone arm to the rest post during the substantially single revolution of the turntable that the cam follower means is in engagement with said cam member, wherein said cam includes a wall extending downwardly from the lower surface of said turntable, said wall being eccentrically disposed about the center of rotation of said turntable and having an inner and an outer surface and a gap therein, said cam follower means being positioned in a predetermined area within said wall when not in engagement with said cam member, said urging means being operative to move said cam follower means through said gap to cause the outer surface of said wall to engage said cam follower means, said cam follower means being operative to return to the predetermined area through said gap after the substantially single revolution of said turntable.

22. A record player as recited in claim 21 further including resilient biasing means for returning said cam follower member to said predetermined area.

23. A record player comprising;
a base;
a tone arm;
a tone arm supporting member on said base, said supporting member having an upwardly extending bearing member and a pair of apertures defined therein adjacent said bearing member;
a tone arm shaft having a pair of opposed ear members extending axially from one end thereof, each of said ear members having an aperture defined therein, said tone arm shaft being disposed in a coaxial relationship with respect to said supporting member with said ear members extending upwardly from beneath said base and through the apertures defined in said supporting member, said tone arm having an end that receives said ear members, said receiving end having a pair of apertures in alignment with the apertures in said ear members; and a pin member extending through the apertures in said ear members and said tone arm and resting on said bearing member.

24. A record player as recited in claim 23 wherein said tone arm shaft includes an integral cycle initiating member.

25. A record player as recited in claim 23 wherein said upwardly extending bearing member is a knife edge bearing member.

* * * * *